United States Patent
Niederst

(10) Patent No.: US 10,919,273 B2
(45) Date of Patent: Feb. 16, 2021

(54) MULTILAYER THERMOPLASTIC FILM

(71) Applicant: SWIMC LLC, Cleveland, OH (US)

(72) Inventor: Jeffrey Niederst, Minneapolis, MN (US)

(*) Notice: Subject to any disclaimer, the term of this patent is extended or adjusted under 35 U.S.C. 154(b) by 389 days.

(21) Appl. No.: 14/882,160

(22) Filed: Oct. 13, 2015

(65) Prior Publication Data

US 2016/0031194 A1 Feb. 4, 2016

Related U.S. Application Data

(63) Continuation of application No. 12/445,728, filed as application No. PCT/US2007/081407 on Oct. 15, 2007, now abandoned.

(Continued)

(51) Int. Cl.
*B32B 27/08* (2006.01)
*B29C 48/21* (2019.01)
(Continued)

(52) U.S. Cl.
CPC .............. *B32B 27/08* (2013.01); *B29C 48/08* (2019.02); *B29C 48/10* (2019.02); *B29C 48/21* (2019.02); *B29C 48/9135* (2019.02); *B32B 7/02* (2013.01); *B32B 27/36* (2013.01); *B29B 13/02* (2013.01); *B29C 48/00* (2019.02); *B29C 48/022* (2019.02); *B29C 48/03* (2019.02); *B29C 48/16* (2019.02); *B29C 48/18* (2019.02); *B29C 48/88* (2019.02); *B29C 48/911* (2019.02); *B29C 48/914* (2019.02); *B29K 2025/00* (2013.01);
(Continued)

(58) Field of Classification Search
None
See application file for complete search history.

(56) References Cited

U.S. PATENT DOCUMENTS 2,347,562 A * 4/1944 Johnston ................. C07C 31/18
560/127
3,877,857 A * 4/1975 Melead ................. B29C 47/065
425/133.5
(Continued)

FOREIGN PATENT DOCUMENTS

EP 1 378 344 A1 1/2004
EP 1 690 677 A1 8/2006
(Continued)

OTHER PUBLICATIONS

Verma, Rajkumar et al. "Some Studies on Melt Flow Behaviour of Poly(Ethylene Terephthalate)". Indian Journal of Fibre & Textile Research, vol. 16, pp. 39-45 (Mar. 1991).*
(Continued)

*Primary Examiner* — Vivian Chen
(74) *Attorney, Agent, or Firm* — Patterson Thuente Pedersen, P.A.

(57) ABSTRACT

A thermoplastic polymer advanceable by solid state polymerization is blended with at least one dissimilar thermoplastic polymer. The blend is solid state polymerized to provide a modified polymer alloy blend having at least one physical or chemical property different from that of the blend before solid state polymerization. The modified polymer alloy blend may be coextruded with a layer of thermoplastic extrusion polymer having a melt viscosity similar to that of the modified polymer alloy.

23 Claims, 5 Drawing Sheets

Related U.S. Application Data

(60) Provisional application No. 60/829,644, filed on Oct. 16, 2006.

(51) Int. Cl.

| | | |
|---|---|---|
| B29C 48/88 | (2019.01) | |
| B32B 7/02 | (2019.01) | |
| B29C 48/08 | (2019.01) | |
| B29C 48/10 | (2019.01) | |
| B32B 27/36 | (2006.01) | |
| B32B 27/30 | (2006.01) | |
| B32B 27/28 | (2006.01) | |
| B32B 7/027 | (2019.01) | |
| B32B 27/16 | (2006.01) | |
| B32B 37/15 | (2006.01) | |
| B32B 27/34 | (2006.01) | |
| B32B 27/40 | (2006.01) | |
| B29C 48/18 | (2019.01) | |
| B29C 48/00 | (2019.01) | |
| B29C 48/03 | (2019.01) | |
| B29C 48/16 | (2019.01) | |
| B29B 13/02 | (2006.01) | |
| B29K 75/00 | (2006.01) | |
| B29K 81/00 | (2006.01) | |
| B29K 33/00 | (2006.01) | |
| B29K 77/00 | (2006.01) | |
| B29K 83/00 | (2006.01) | |
| B29K 69/00 | (2006.01) | |
| B29K 25/00 | (2006.01) | |
| B29K 27/12 | (2006.01) | |
| B29K 71/00 | (2006.01) | |
| B29K 67/00 | (2006.01) | |
| B29K 79/00 | (2006.01) | |
| B29L 7/00 | (2006.01) | |
| B29L 9/00 | (2006.01) | |

(52) U.S. Cl.
CPC ...... *B29K 2027/12* (2013.01); *B29K 2033/00* (2013.01); *B29K 2067/00* (2013.01); *B29K 2067/003* (2013.01); *B29K 2069/00* (2013.01); *B29K 2071/00* (2013.01); *B29K 2075/00* (2013.01); *B29K 2077/00* (2013.01); *B29K 2079/08* (2013.01); *B29K 2081/06* (2013.01); *B29K 2083/00* (2013.01); *B29K 2995/0041* (2013.01); *B29L 2007/008* (2013.01); *B29L 2009/00* (2013.01); *B32B 7/027* (2019.01); *B32B 27/16* (2013.01); *B32B 27/28* (2013.01); *B32B 27/281* (2013.01); *B32B 27/283* (2013.01); *B32B 27/285* (2013.01); *B32B 27/286* (2013.01); *B32B 27/288* (2013.01); *B32B 27/30* (2013.01); *B32B 27/302* (2013.01); *B32B 27/304* (2013.01); *B32B 27/308* (2013.01); *B32B 27/34* (2013.01); *B32B 27/365* (2013.01); *B32B 27/40* (2013.01); *B32B 37/15* (2013.01); *B32B 37/153* (2013.01); *B32B 2250/02* (2013.01); *B32B 2250/03* (2013.01); *B32B 2250/244* (2013.01); *B32B 2270/00* (2013.01); *B32B 2272/00* (2013.01); *B32B 2307/30* (2013.01); *B32B 2325/00* (2013.01); *B32B 2327/00* (2013.01); *B32B 2333/12* (2013.01); *B32B 2367/00* (2013.01); *B32B 2369/00* (2013.01); *B32B 2371/00* (2013.01); *B32B 2375/00* (2013.01); *B32B 2377/00* (2013.01); *B32B 2379/08* (2013.01); *B32B 2383/00* (2013.01); *B32B 2439/00* (2013.01); *B32B 2439/70* (2013.01); *B32B 2451/00* (2013.01); *Y10T 428/24802* (2015.01); *Y10T 428/3154* (2015.04); *Y10T 428/31504* (2015.04); *Y10T 428/31507* (2015.04); *Y10T 428/31551* (2015.04); *Y10T 428/31721* (2015.04); *Y10T 428/31725* (2015.04); *Y10T 428/31786* (2015.04); *Y10T 428/31855* (2015.04); *Y10T 428/31935* (2015.04)

(56) References Cited

U.S. PATENT DOCUMENTS

| | | | |
|---|---|---|---|
| 3,882,219 A * | 5/1975 | Wiley | B29C 48/21 264/174.1 |
| 4,069,278 A | 1/1978 | Borman et al. | |
| 4,100,237 A * | 7/1978 | Wiley | B29C 48/08 264/40.6 |
| 4,132,707 A | 1/1979 | Borman | |
| 4,147,738 A | 4/1979 | Borman | |
| 4,286,011 A * | 8/1981 | Wong | B29C 55/08 428/212 |
| 4,403,090 A * | 9/1983 | Smith | C08G 63/181 528/272 |
| 4,405,547 A * | 9/1983 | Koch | B29C 48/307 264/173.16 |
| 4,418,188 A | 11/1983 | Smith et al. | |
| 4,424,337 A | 1/1984 | Smith et al. | |
| 4,551,368 A | 11/1985 | Smith et al. | |
| 4,590,259 A | 5/1986 | Kosky et al. | |
| 4,593,077 A * | 6/1986 | Borman | C08J 3/005 525/444 |
| 4,643,925 A * | 2/1987 | Smith | B29C 49/22 428/213 |
| 4,663,103 A * | 5/1987 | McCullough | B32B 27/306 264/40.4 |
| 4,753,832 A | 6/1988 | Brown et al. | |
| 4,778,858 A | 10/1988 | Ginnings | |
| 4,891,406 A | 1/1990 | Bittscheidt et al. | |
| 5,233,465 A * | 8/1993 | Wheatley | G02B 5/282 359/359 |
| 5,243,020 A | 9/1993 | Ghisolfi | |
| 5,276,089 A * | 1/1994 | Colby | C08L 25/18 525/132 |
| 5,300,572 A * | 4/1994 | Tajima | C08L 23/08 525/167 |
| 5,307,934 A | 5/1994 | Hagner | |
| 5,382,628 A | 1/1995 | Stewart et al. | |
| 5,412,024 A | 5/1995 | Okada et al. | |
| 5,554,657 A * | 9/1996 | Brownscombe | C08J 11/08 209/166 |
| 5,646,208 A * | 7/1997 | Cattron | C08L 67/02 524/128 |
| 5,663,281 A | 9/1997 | Brugel | |
| 5,688,874 A * | 11/1997 | Hoffman | C08G 63/80 525/444 |
| 5,725,944 A | 3/1998 | Jones et al. | |
| 5,852,134 A | 12/1998 | Al Ghatta | |
| 5,919,872 A * | 7/1999 | Tung | C08G 63/80 525/439 |
| 5,948,544 A * | 9/1999 | Kim | B32B 27/36 428/480 |
| 6,045,895 A * | 4/2000 | Hyde | B32B 7/12 428/213 |
| 6,153,264 A | 11/2000 | Schmid et al. | |
| 6,153,680 A * | 11/2000 | Shah | C08L 23/08 264/177.2 |
| 6,210,769 B1 | 4/2001 | DiPede et al. | |
| 6,270,909 B1 * | 8/2001 | Moulton | B32B 27/08 428/474.4 |
| 6,312,641 B1 * | 11/2001 | Hutchinson | B29C 45/1625 220/62.22 |
| 6,476,180 B1 * | 11/2002 | Kapur | C08G 63/183 528/271 |
| 6,967,778 B1 * | 11/2005 | Wheatley | G02B 5/28 359/580 |

(56) References Cited

U.S. PATENT DOCUMENTS

| | | | | |
|---|---|---|---|---|
| 7,226,985 | B2 * | 6/2007 | Hale | C08L 67/02 525/166 |
| 8,440,769 | B2 * | 5/2013 | Kannan | C08G 63/553 525/425 |
| 8,790,787 | B2 * | 7/2014 | Niederst | C09D 167/02 428/458 |
| 2002/0128357 | A1 * | 9/2002 | D. Goossens | C08K 5/49 524/115 |
| 2003/0072931 | A1 * | 4/2003 | Hebrink | B32B 7/02 428/212 |
| 2003/0141625 | A1 * | 7/2003 | Shelby | B29C 45/16 264/173.11 |
| 2004/0010073 | A1 * | 1/2004 | Shiga | C08G 63/916 524/539 |
| 2004/0013833 | A1 * | 1/2004 | Lee | B32B 27/08 428/35.7 |
| 2004/0101687 | A1 * | 5/2004 | Crawford | B32B 27/12 428/412 |
| 2004/0102032 | A1 * | 5/2004 | Kloster | H01L 21/02118 438/623 |
| 2004/0116619 | A1 * | 6/2004 | Moad | C08G 63/19 525/418 |
| 2004/0119804 | A1 * | 6/2004 | Emslander | B41M 5/52 347/105 |
| 2004/0138388 | A1 * | 7/2004 | Pecorini | C08L 67/02 525/439 |
| 2004/0163556 | A1 | 8/2004 | Kugo et al. | |
| 2004/0253429 | A1 * | 12/2004 | Polk, Jr. | B29C 43/34 428/292.1 |
| 2005/0100749 | A1 | 5/2005 | Hu et al. | |
| 2005/0112331 | A1 * | 5/2005 | Donea | B32B 3/12 428/166 |
| 2006/0030678 | A1 * | 2/2006 | Brown | B32B 1/02 525/437 |
| 2006/0135668 | A1 | 6/2006 | Hayes | |
| 2006/0199921 | A1 * | 9/2006 | Hale | C08L 67/00 525/433 |
| 2006/0270806 | A1 * | 11/2006 | Hale | C08J 5/18 525/439 |
| 2006/0281842 | A1 * | 12/2006 | Hoppe | C08K 3/08 524/318 |
| 2008/0063841 | A1 * | 3/2008 | Matsubara | B32B 27/00 428/172 |
| 2008/0118718 | A1 | 5/2008 | Kolke et al. | |
| 2010/0044923 | A1 | 2/2010 | Haimoff et al. | |
| 2010/0279130 | A1 * | 11/2010 | Niederst | C09D 167/00 428/458 |
| 2010/0279132 | A1 * | 11/2010 | Niederst | B32B 7/02 428/480 |
| 2011/0220645 | A1 * | 9/2011 | Niederst | B32B 15/08 220/200 |
| 2013/0177711 | A1 * | 7/2013 | Niederst | C09D 167/00 427/409 |

FOREIGN PATENT DOCUMENTS

| | | | |
|---|---|---|---|
| JP | H04-306582 | | 10/1992 |
| JP | 05-086277 | A | 4/1993 |
| JP | H06-36859 | | 2/1994 |
| JP | H09-104091 | | 4/1997 |
| JP | 10-279784 | A * | 10/1998 |
| JP | H11-010723 | | 1/1999 |
| JP | 11-322968 | A * | 11/1999 |
| JP | 2001-226569 | | 8/2001 |
| JP | 2001-246695 | | 9/2001 |
| JP | 2002-234571 | | 8/2002 |
| JP | 2003-231230 | | 8/2003 |
| JP | 2004-114476 | | 4/2004 |
| JP | 2004-314570 | | 11/2004 |
| JP | 2004-351927 | | 12/2004 |
| JP | 2005-144876 | | 6/2005 |
| JP | 2005-306419 | | 11/2005 |
| WO | WO 92/13033 | A * | 8/1992 |
| WO | WO 95/17303 | * | 6/1995 |
| WO | WO 00/13887 | * | 3/2000 |
| WO | WO 00/13888 | * | 3/2000 |

OTHER PUBLICATIONS

"Film Coextrusion—A Troubleshooting Guide" (Nov. 1994) (Year: 1994).*
"Predominately" (https://www.thefreedictionary.com/predominately) (webpage retrieved Dec. 5, 2019) (Year: 2016).*
"Predominantly" (https://www.thefreedictionary.com/predominantly) (webpage retrieved Dec. 5, 2019) (Year: 2016).*
"Selected Thermal Properties" (https://pslc.ws/howwhy/thermalp.htm) (webpage retrived Dec. 7, 2019) (Year: 1998).*
Frounchi et al., Studies on Recycling of Poly(ethylene terephthalate) Beverage Bottles, Iranian Polymer Journal, vol. 6, No. 4 (1997).
Polymer Processing: polybutylene terephthalate, retrieved on Nov. 17, 2014.
Polymer Processing: polycarbonate, retrieved Nov. 17, 2014.
Polymer Processing: polyethylene terephthalate, retrieved on Nov. 17, 2014.
Closeup on Technology—Recycled PET/PE Alloys Show Promise in Monofilament, Pallets, Pipe, *Plastics Technology Online* (May 2004) [downloaded from the Internet Archive entry for Jan. 20, 2005, at http://web.archive.org/web/20050120191049/http://www.ptonline.com/articles/200405cul.html], 2 pages.
EREMA® Recycling News, "VACUREMA PET—Success Stories" (Edition 2004/2005), 4 pgs.
EREMA® High Tech Recycling brochure entitled "PET Extrusion System VACUREMA", 6 pgs (Oct. 2004).
Petcore PET Container Recycling Europe brochure entitled "Amosorb copolyester, Best Packaging by bp", vol. 3, No. 1, 4 pgs (Apr. 2001).
Malloy, Robert, "Potential End Uses for Polyester Fiber Waste: A Laboratory Study", Chelsea Center for Recycling and Economic Development, University of Massachusetts Lowell, Technical Report #33, 13 pgs (Oct. 2000).
Jansen, Martinus, A.G., "Modification of poly (butylenes terephthalate) by incorporation of comonomers in the solid state", 168 pgs, (2005).
Wen-Yi, S. et al., "In situ copolymerization and compatibilization of polyester and polystyrene blends. II. Thermally and chemically induced reaction and mechanical properties", Polymer, 42, pp. 5121-5134 (2001).
U.S. Appl. No. 13/782,538 Non-Final Office Action, 20 pgs (dated Jul. 17, 2013).
Borman, W.F.H., "Molecular Weight-Viscosity Relationships for Poly (1,4-butylene Terephthalate)," Journal of Applied Polymer Science, vol. 22, pp. 2119-2126 (1978).
Eastapak™ Polymer 9921 Product Data Sheets, Eastman, 4 pgs (May 25, 2011).
Dynapol® P 1500 Product Data Sheets, Evonik Industries, 2 pgs (Aug. 10, 2001).
Polyclear® Refresh PET 1101 Typical Property Data Sheet, 2 pgs (Apr. 30, 2010).
Polymer Processing.com-polypropylene, retrieved on May 23, 2014 at: http://wwvv.polymerprocessing.com/polymers/PP.html.
McKetta et al., Encyclopedia of Chemical Processing and design, p. 7, Alkyd (1999).
FOSH Glossary, Aramide, retrieved on Jul. 5, 2011 at: http://www.fosh.com.my/glossary.html.
Thermal Analysis of Polymers, Fundamentals and Applications, p. 68: Table 2.1 Glass Transition Temperatures for Common Polymers (2009).
Gottfert: Rheo-Info-Detection of the intrinsic Viscosity (Gottfert), retrieved on Jan. 24, 2014.
PolymerProcessing.com, poly(ethylene isophthalate) retrieved on Jan. 24, 2014.
Papadopoulou et al., Compatibility behavior of blends of poly(ethylene terephthalate) with an amorphous copolyester, Polymer, vol. 38, No. 3, pp. 631-637 (1997).

(56) References Cited

OTHER PUBLICATIONS

U.S. Pharmacopeia, Polyethylene Terephthalate Bottles and Polythethlyene Terephthalate G. Bottles, retrieved on Apr. 12, 2012 at: http://www.pharmacopeia.cn/v29240/usp29nf24s0_c661s51.hyml.
Eastman, Eastar 6763 Product Data Sheet, retrieved on Apr. 11, 2012.
Dictionary.com: Coating, p. 3, retrieved on Sep. 15, 2012 at: http://dictionary.reference.com/browse/Coating?r=66.
Davis, Scott P., "PET Resin SSP Market and Technology Trends", UOP Sinco™ Polyester 2003 Conference, Zurich Switzerland, 27 pgs (Dec. 1, 2003).

* cited by examiner

MULTILAYER THERMOPLASTIC FILM

CROSS REFERENCE TO RELATED APPLICATIONS

This application is a Continuation of application Ser. No. 12/445,728 filed on Apr. 15, 2009, abandoned, which is a National Stage filing of International Application No. PCT/US2007/081407 filed on Oct. 15, 2007, which claims priority under 35 U.S.C. 119 (e) to U.S. Provisional Application No. 60/829,644 filed on Oct. 16, 2006 by Jeffrey Niederst, all entitled "Multilayer Thermoplastic Film", the disclosures of which are incorporated herein by reference in their entirety.

TECHNICAL FIELD

This invention relates to multilayer thermoplastic films.

BACKGROUND

It sometimes is difficult to prepare multilayer thermoplastic films. Thermoplastic films may require one or more potentially conflicting features such as adequate adhesion to a nearby surface, oil-repellence, water-repellence, lubricity or other surface-related properties; storage stability; strength, impact resistance or elasticity; chemical, abrasion or weathering resistance; low cost; or other desired properties. Multilayer films require in addition that the individual layers be capable of being formed adjacent one another, e.g., via coextrusion.

SUMMARY OF THE INVENTION

We have found that dissimilar polymers, or a polymer and a filler, may be melt-blended and the blend thereafter subjected to solid state polymerization to provide a modified polymer alloy or filled polymer blend having one or more properties that may be superior to those of the source polymer(s), a simple blend of the source polymers, or a blend of the source polymer and filler. Without intending to be bound by theory, the solid state polymerization process may rearrange blocks or segments of the source polymer(s) to provide a new polymer alloy or filled polymer blend having unique properties. The resulting modified polymer blend may be used to form one or more layers of a multilayer thermoplastic film that might otherwise be difficult to form by coextrusion. Successful thermoplastic multilayer film coextrusion at commercially desirable extrusion rates can be difficult unless the individual film layers have similar melt viscosities, e.g., melt viscosities within about ±15% of one another at a chosen extrusion temperature and extrusion rate. The disclosed modified polymer alloy or filled polymer blends may be coextruded with a thermoplastic polymer whose melt viscosity has a given value at a chosen extrusion temperature and extrusion rate, by melt-blending dissimilar polymers or a polymer and a filler to form a blend having a lower melt viscosity than the given value, subjecting the blend to solid state polymerization to provide a modified polymer alloy or filled polymer blend whose melt viscosity is sufficiently close to the given value so that the modified polymer alloy or filled polymer blend and the thermoplastic polymer may be coextruded, and coextruding layers of the modified polymer alloy or filled polymer blend and thermoplastic polymer to form a multilayer film.

The present invention thus provides, in one aspect, a process for forming a multilayer film comprising:

a) providing a first thermoplastic polymer whose melt viscosity has a given value at a chosen temperature and extrusion rate;

b) providing a second thermoplastic polymer advanceable by solid state polymerization and having a melt viscosity at the chosen temperature and extrusion rate sufficiently unlike the given value so that the first and second thermoplastic polymers cannot be coextruded to form a freestanding, self-supporting multilayer film;

c) blending the second thermoplastic polymer with:
   i) at least one dissimilar thermoplastic polymer, or
   ii) an organic or inorganic particulate filler;

d) solid state polymerizing the second thermoplastic polymer to provide a modified polymer alloy or filled polymer blend whose melt viscosity at the chosen temperature and extrusion rate is sufficiently close to the given value so that the modified polymer alloy or filled polymer blend and the first thermoplastic polymer may be coextruded to form a freestanding, self-supporting multilayer film;

e) coextruding a layer of the modified polymer alloy or filled polymer blend and a layer of the first thermoplastic polymer; and f) cooling the coextruded layers to form a freestanding, self-supporting multilayer film.

The present invention provides, in another aspect, a freestanding, self-supporting multilayer film comprising two or more polymeric layers, wherein at least one layer comprises a modified polymer alloy or filled polymer blend comprising a thermoplastic polymer and (i) at least one dissimilar polymer or (ii) an organic or inorganic particulate filler, wherein the thermoplastic polymer has been advanced by solid state polymerization and the blend has a melt viscosity greater than that of the blend before solid state polymerization.

DETAILED DESCRIPTION

Figure 1:
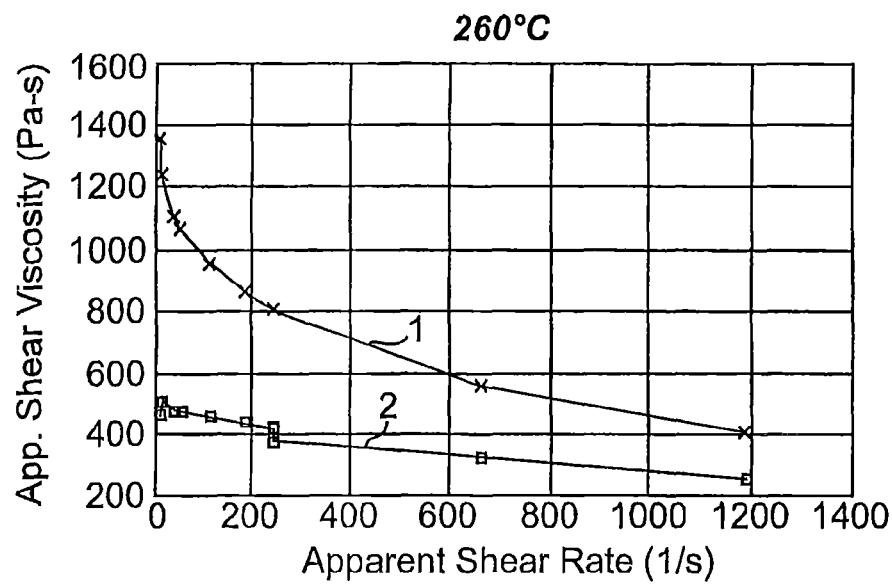
FIG. 1 is a graph of apparent shear viscosity vs. apparent shear rate at 260° C. for a conventional thermoplastic polymer and a thermoplastic polymer blend, as employed in Comparative Example 1.

The term "polymer" includes homopolymers, copolymers and ter- and higher polymers, having random, block, graft or other backbone arrangements. The phrase "dissimilar polymers" refers to polymers whose backbones contain an arrangement of different materials (e.g., polymers of different monomers) and to polymers whose backbones contain different arrangements of the same materials (e.g., random and block copolymers of the same monomers). The phrase "similar polymers" refers to polymers whose backbones contain the same arrangement of the same materials. For example, the backbones in polyethylene terephthalate ("PET") and polyethylene ("PE") are arrangements of different monomers, and PET and PE are dissimilar polymers. Virgin PET and recycled PET are polymers whose backbones contain the same arrangement of the same materials, but which typically differ in chain lengths and acid numbers. Virgin PET and recycled PET are similar polymers.

The term "advanceable" when used with respect to a polymer refers to a polymer whose weight average molecular weight can be increased by solid state polymerization.

The terms "blend" and "blending" refer to any process that combines two or more polymers, or a polymer and an organic or inorganic filler, into a mixture that is at least macroscopically homogenous, and to such a mixture. The term "melt-blending" refers to any blending process carried out at or above the melting temperature (Tm) of at least one of the polymers in a blend of polymers.

The phrase "freestanding, self-supporting" when used with respect to a film means that at room temperature the film can be unwound by itself from a supply reel and wound up on a take-up reel using conventional film-handling equipment.

The phrases "solid state polymerization" and "solid state polymerizing" refer to a process which through the application of heat furthers the polymerization (e.g., increases the intrinsic viscosity) of a polymer while in solid form.

The disclosed process includes an advanceable thermoplastic polymer. A variety of advanceable polymers may be employed. Representative advanceable polymers include condensation polymers and addition polymers, with condensation polymers being preferred. Alkyd polyesters made by reacting together one or more acid anhydrides, polyols and unsaturated fatty acids, or made by transesterifying a mixture of one or more polyols and oils, may also be employed. Representative fatty acids include dehydrated castor fatty acids, linolenic fatty acids, ricinoleic fatty acids, soya fatty acids, and the like; and byproducts and combinations thereof. Representative oils include vegetable oils such as canola oil, castor oil, dehydrated castor oil, coconut oil, corn oil, cottonseed oil, ground nut oil, linseed oil, peanut oil, ricinene oil, safflower oil, soybean oil, sunflower oil, tall oil, tung oil, walnut oil, wood oil, and the like; animal fats such as fish oil, lard, poultry fat, tallow, and the like; and byproducts and combinations thereof. Other advanceable polymers include polyesters and copolyesters such as PET, polybutylene terephthalate ("PBT"), polyethylene naphthalate ("PEN"), polybutylene naphthalate ("PBN") and other esters of acids and diols that will be familiar to persons having ordinary skill in the art; polylactones such as polycaprolactone; polymethyl methacrylate ("PMMA"); styrene/maleic anhydride ("SMA"); polyoxymethylene ("POM"); ketones such as polyetheretherketone ("PEEK") and polyaryletherketone ("PAEK"); thermoplastic fluoropolymers; polycarbonate ("PC"); polyurethanes; polyarylate ("PAR"); polyphenylene oxide ("PPO"); polyamides such as nylon 6, nylon 6,6, nylon 11, nylon 6,12 and nylon 12; imides such as polyimide ("PI"), polyetherimide ("PEI") and polyamideimide ("PAI"); polyphthalamide; sulfones such as polysulfone ("PSul"; polyarylsulfone ("PAS") and poly ether sulfone ("PES"); polyaminoacids; polydimethylsiloxanes; mixtures thereof; and derivatives thereof which do not interfere with solid state polymerization (e.g., appropriately substituted polymers such as halogen-substituted polymers). The disclosed blends may also include (but do not have to include) a non-advanceable polymer. Representative non-advanceable polymers that may be blended with the advanceable polymer include polyolefins such as polyethylene ("PE"), polypropylene ("PP") and polybutylene ("PB"); styrenes such as polystyrene ("PS"), poly α-methyl styrene and styrene/acrylonitrile ("SAN"); vinyls such as polyvinyl chloride ("PVC") and polyvinylnaphthalene ("PVN"); and mixtures thereof. Representative mixtures of advanceable polymers and non-advanceable polymers include mixtures of esters and olefins (for example, PET and polyethylene). Preferably all of the polymers in a blend of dissimilar polymers are thermoplastic, and more preferably all of the polymers in a blend of dissimilar polymers are advanceable thermoplastics. However, blends containing thermoplastic and non-thermoplastic (e.g., thermoset) polymers may be employed if desired.

Blends containing the disclosed polymers may be combined in a variety of ratios and in any desired order. For example, a blend of first and second dissimilar polymers may contain from about 99 to about 1 weight percent of a first polymer and from about 1 to about 99 weight percent of a second polymer, from about 95 to about 5 weight percent of a first polymer and from about 5 to about 95 weight percent of a second polymer, from about 90 to about 10 weight percent of a first polymer and from about 10 to about 90 weight percent of a second polymer, or from about 80 to about 20 weight percent of a first polymer and from about 20 to about 80 weight percent of a second polymer. More than two (for example, three or more, four or more or five or more) dissimilar polymers may be combined to make the disclosed blends. The dissimilar polymers typically will differ with respect to at least one or more physical or chemical properties. Representative such properties may include molecular weight, density, glass transition temperature (Tg), melting temperature (Tm), intrinsic viscosity (IV), melt viscosity (MV), melt index (MI), crystallinity, arrangement of blocks or segments, availability of reactive sites, reactivity with respect to various gases or liquids, acid number, surface energy, hydrophobicity, oliophobicity, moisture or oxygen permeability, transparency, heat resistance, resistance to sunlight or ultraviolet energy, adhesion to substrates including metals or plastics, and recyclability. Melt viscosity is an especially useful property that can be varied by subjecting a blend of dissimilar polymers to solid state polymerization, thereby enabling preparation of desirable polymer alloys from dissimilar polymers whose melting points differ by, for example, more than about ±50%, more than about ±10%, or more than about ±5% at temperatures of about 200-300° C. and shear rates of about 50-500 Pa-sec. For properties measured on an absolute scale, the dissimilar polymer properties may for example differ by about ±5%, by about +10%, by about +15%, by about +25%, by about ±50%, or by about ±100% or more. The dissimilar polymers may be in any convenient form including flakes, pellets, powder or a melt. The dissimilar polymers may optionally be dried prior to being blended. Drying may also in some instances be advantageously avoided, thus enabling an appreciable saving in processing time and equipment cost.

The disclosed advanceable thermoplastic polymer may instead or also be blended with an organic or inorganic particulate filler. A variety of organic fillers may be employed, including polymeric particles (e.g., polymeric nanoparticles), micronized organic polymers such as micronized polytetrafluoroethylene, hydrogels, core-shell polymer systems, sheathed polymer systems and other organic fillers that will be familiar to persons having ordinary skill in the art. A variety of inorganic fillers may be employed, including metal oxides such as titanium dioxide, silicon dioxide, iron oxide, zinc oxide, antimony oxide and zirconium oxide (including metal oxide nanoparticles); metal sulfides and metal sulfates such as cadmium sulfide, zinc sulfide, barium sulfate, and lithopone; metal nitrides such as boron nitride; metal oxychlorides such as bismuth oxychloride; earth compounds including clays such as sienna or umber (including clay nanoparticles); calcium carbonate; talc; wollastonite; and other inorganic fillers that will be familiar to persons having ordinary skill in the art. The disclosed advanceable thermoplastic polymer and filler may be combined in a variety of ratios. For example, a blend of polymer and filler may contain from about 15 to about 99.9 weight percent polymer and from about 85 to about 0.1 weight percent filler, from about 30 to about 99.9 weight percent polymer and from about 70 to about 0.1 weight percent filler, or from about 50 to about 99.9 weight percent polymer and from about 50 to about 0.1 weight percent filler. As one example, pigmented films are sometimes employed, e.g., for food packaging where a bright, white coloration implies a sanitary, clean environment conducive to the marketing of food-related products. A suitably white multilayer film may be obtained, for example, by adding a whitening agent such as titanium dioxide within one or all of the film layers. High pigment levels may be needed (e.g., 40 weight percent or more) in order to achieve the necessary optical properties and performance.

The disclosed blends of dissimilar polymers or of a polymer and filler may contain one or more adjuvants. Representative adjuvants include solvents, antimicrobial agents, UV absorbers, light stabilizers, antioxidants and adhesion promoters. These and other useful adjuvants will be apparent to persons having ordinary skill in the art.

The disclosed blends may be combined using equipment and techniques that will be familiar to persons having ordinary skill in the art. Melt-blending is preferred but not required. The blend desirably is homogeneous but homogeneity is not required. One convenient method for blending dissimilar polymers or a polymer and filler is to combine the ingredients in an extruder, e.g., a single screw or multiple screw extruder. The extruder may be heated at one or more locations along its length, e.g., to a temperature above that of the Tm of at least one and preferably all of the dissimilar polymers in the blend.

The blend may be finely divided (e.g., pelletized, granulated or made into flakes, using equipment and techniques that will be familiar to persons having ordinary skill in the art) before the blend is solid state polymerized. The finely divided blend may if desired be stored until such time as it can be solid state polymerized, and may if desired be subjected to an optional intermediate step such as heating or cooling to promote crystallization.

Solid state polymerization may be performed using equipment and techniques that will be familiar to persons having ordinary skill in the art. One convenient method is to place the pelletized blend in a suitable sealed vessel heated to a temperature below the melting point of the blend or below the melting point of the major component thereof (e.g., to a temperature of about 150 to about 250° C., about 170 to about 220° C. or about 180 to about 210° C.), in an inert or nonreactive atmosphere (e.g., argon or nitrogen) for a time sufficient to provide a modified polymer alloy or filled polymer blend having at least one physical or chemical property different from that of the unmodified blend. Such time may for example be about 2 to about 24 hours, about 5 to about 20 hours or about 8 to about 16 hours.

The modified polymer alloy or filled polymer blend may be used to make multilayer films using a variety of equipment that will be familiar to persons having ordinary skill in the art, including flat film extrusion lines and blown (tubular) film lines. The extruded film may if desired be formed against a chill roll. The films may be subjected to heat treatment (including heat setting or annealing), stretching (e.g., longitudinal stretching, widthwise stretching (tentering) or biaxial stretching), surface treatments (e.g., corona treatment), metallization, and other processing or conversion steps that will be familiar to persons having ordinary skill in the art.

The resulting multilayer films may be used for a variety of applications that will be familiar to persons having ordinary skill in the art, including packaging films (e.g., for frozen, fresh or hot foods), building materials (e.g., housewrap) and decorative or graphic films. An external surface of the completed film may if desired be adhered to another film or to a substrate using an appropriate adhesive, or using a heat lamination process (e.g., a heated film or heated substrate) for films having an appropriate external layer.

Figure 8:
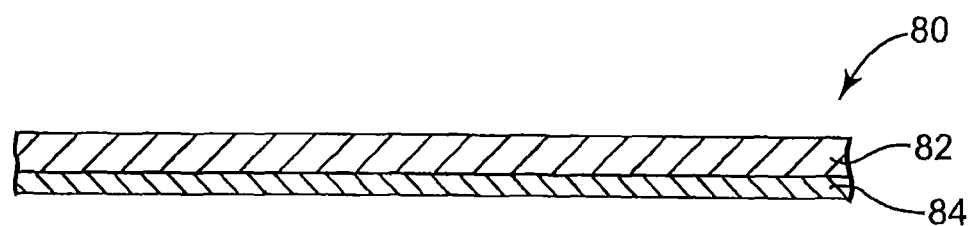
FIG. 8 and FIG. 9 are schematic cross-sectional views of two freestanding, self-supporting multilayer films.
Figure 9:
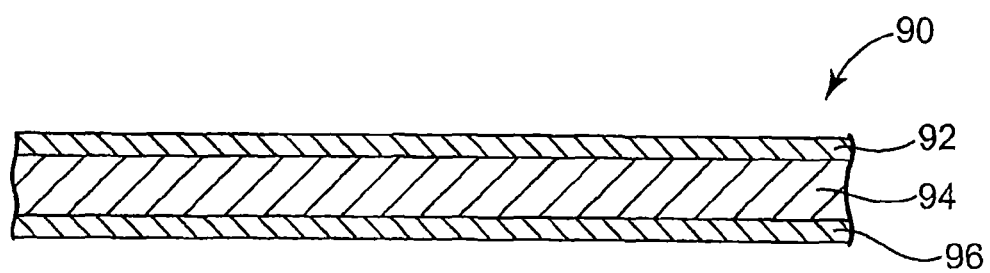

FIG. 8 shows a schematic cross-sectional view of a multilayer film 80, in which a thicker layer 82 of unmodified polymer is adjacent a thinner layer 84 of modified polymer alloy or filled polymer. The resulting coated article might also be like article 90 in FIG. 9, in which a thinner layer 92 of modified polymer alloy or filled polymer blend lies atop thicker layer 94 of unmodified polymer which in turn lies atop a thinner layer 96 of modified polymer alloy or filled polymer. Persons having ordinary skill in the art will appreciate that other numbers and arrangements of the disclosed layers are possible. The disclosed multilayer films may for example contain two layers, three layers, four layers, five layers or more layers (e.g., ten or eleven layers). The layers may have a variety of thicknesses, e.g., a thickness of about 1 micrometer to about 10 millimeters, about 1 micrometer to about 1 millimeter, or about 1 micrometer to about 100 micrometers. A variety of dissimilar thermoplastic extrusion polymers may be employed, including the various thermoplastic polymers mentioned above. The dissimilar thermoplastic extrusion polymer may be different from or the same as any polymer in the modified polymer alloy or filled polymer blend. For example, the dissimilar thermoplastic extrusion polymer may be the same as the higher-melting of two dissimilar polymers in a binary polymer alloy.

The melt viscosities of the individual layers desirably are within about ±15%, ±10% or ±5% of one another at the chosen extrusion temperature and extrusion rate. If the melt viscosity and hence the flow rate of one or more of the coextruded layers is substantially different from that of another coextruded layer, the multilayer film may be deficient in one or more respects. When typical commercially available polymers are coextruded to make multilayer films, the selection of materials which match a given viscosity requirement may be quite limited. Thus existing coextrusion systems may employ layers of materials having not only very closely matched melt viscosities but also very similar other physical and chemical properties as well. Such systems may not provide broad performance characteristics and may tend to perform more like a thick monolayer film of a single material than like a true multilayer film system.

Formulators have also sought to broaden the performance properties of coextruded multilayer films by blending multiple materials in a given layer or layers. Such blending is intended to provide a mixture of chemical or physical properties that cannot be achieved in one layer. The layer formulation may for example contain two or more materials that are typically pre-blended (pre-compounded) and then added to the film forming equipment to provide a single distinct layer. However, pre-compounding can deleteriously affect the viscosity of the blended materials, due perhaps to the effects of mechanical shear, heat, moisture or other factors encountered during the pre-compounding process. For example, when two materials with very similar melt viscosities are pre-compounded, the resulting blend may have a much lower melt viscosity than that of either starting material. Such reduced melt viscosity can dramatically limit the extent to which coextruded multilayer films can be formed using pre-compounded blends of materials in a layer. A similar reduction in melt viscosity may be observed when a polymer and a particulate filler are pre-compounded.

The disclosed processes enable the fabrication of proprietary polymer alloys and filled polymer blends possessing properties not available from commercially supplied products. One or more properties of the polymer alloy may for example be unavailable in or superior to a corresponding property of the neat starting materials or a simple blend thereof. The disclosed processes thus permit several starting materials to be combined via a melt compounding process to form an alloy or blend that may have some properties desired by an end user in a final product, but which may lack other properties (for example, a suitable melt flow rate) also needed in such final product. The pellet's properties can be modified using solid state polymerization to provide a modified polymer alloy or filled polymer blend having more satisfactory overall properties and better compatibility with other layers in a multilayer coextruded film line.

The invention is further illustrated in the following non-limiting examples, in which all parts and percentages are by weight unless otherwise indicated.

Comparative Example 1

Blended First and Second Polymers

Pre-dried samples (moisture <100 ppm, by Karl-Fischer analysis) of KOSA™ 1101E fast-crystallizing PET ("CPET", from Invista) and DYNAPOL™ P1500HV partially crystalline copolyester (from Degussa) were combined in a 50:50 ratio, compounded in a ZSK twin-screw extruder (from Werner & Pfleiderer) and pelletized into small, cylindrical pellets. KOSA 1101E CPET is a bottle grade, 0.8 intrinsic viscosity (IV) thermoplastic polymer and is fairly hard and durable. DYNAPOL P1500HV copolyester resin is a soft, adhesive resin having a much lower melt viscosity than KOSA 1101E CPET.

The pelletized blend was dried (moisture <100 ppm, by Karl-Fischer analysis) using a CONAIR™ dryer from Conair Corp and analyzed for melt viscosity at 260° C. using a DYNISCO™ LCR7000 capillary rheometer. A reference sample of dried KOSA 1101E CPET was also analyzed. FIG. 1 shows viscosity versus shear curves for the reference sample (curve 1) and for the blend (curve 2). Set out below in Table 1 is a comparison of melt flow rates and shear viscosities for the reference sample and for the blend.

TABLE 1

| | Melt Viscosity Data (260° C.) | | |
| --- | --- | --- | --- |
| | Reference (100% KOSA 1101E CPET; Curve 1) | Blend (50% KOSA 1101E CPET/50% DYNAPOL P 1500HV; Curve 2) | % Difference |
| Melt Flow Rate (g/10 min) | 6.245 | 15.951 | +155% |
| Viscosity (100 s−1) | 974 Pa-s | 460 Pa-s | −53% |
| Viscosity (200 s−1) | 819 Pa-s | 414 Pa-s | −49% |
| Viscosity (500 s−1) | 611 Pa-s | 339 Pa-s | −45% |

The data in Table 1 shows that inclusion in the blend of DYNAPOL P1500HV polymer provided a blend whose melt viscosity was significantly lower than that of 100% KOSA PET, and well beyond the +15% guideline for acceptable coextrusion. The blend would not be useable as a layer adjacent to a layer of KOSA PET in a coextruded multilayer film.

Example 1

Blended First and Second Polymers Subjected to Solid State Polymerization

Figure 2:
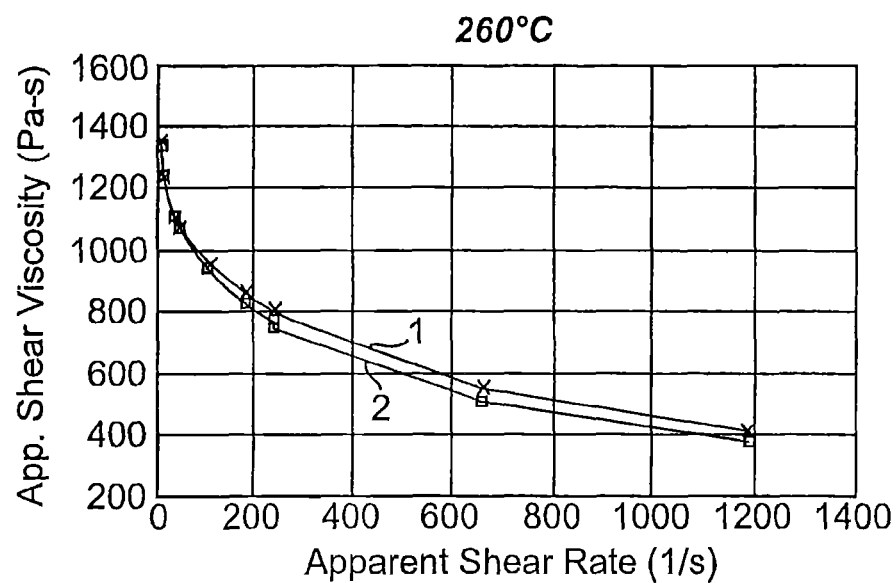
FIG. 2 is a graph of apparent shear viscosity vs. apparent shear rate at 260° C. for a conventional thermoplastic polymer and a solid state polymerized thermoplastic polymer blend, as employed in Example 1.

The Comparative Example 1 pelletized blend was subjected to solid state polymerization for 16 hours at 200° C. under a vacuum of about 760 mm Hg. The resulting polymer alloy pellets were dried and analyzed for melt viscosity using the method of Comparative Example 1. A reference sample of dried KOSA 1101E CPET was also analyzed. FIG. 2 shows viscosity versus shear curves for the reference sample (curve 1) and for the solid state polymerized blend (curve 2). Set out below in Table 2 is a comparison of melt flow rates and shear viscosities for the reference sample and for the solid state polymerized blend.

TABLE 2

Melt Viscosity Data (260° C.)

| | Reference (100% KOSA 1101E CPET; Curve 1) | Polymer Alloy (50% KOSA 1101E CPET/50% DYNAPOL P 1500HV; Curve 2) | % Difference |
|---|---|---|---|
| Melt Flow Rate (g/10 min) | 6.245 | 6.241 | −0.10% |
| Viscosity (100 s−1) | 974 Pa-s | 954 Pa-s | −2.1% |
| Viscosity (200 s−1) | 819 Pa-s | 789 Pa-s | −3.7% |
| Viscosity (500 s−1) | 611 Pa-s | 573 Pa-s | −6.2% |

The data in Table 2 shows that solid state polymerization of the blend increased the observed melt viscosity sufficiently to meet melt viscosity guidelines for acceptable coextrusion.

Comparative Example 2

Three Layer Coextrusion System

Figure 3:
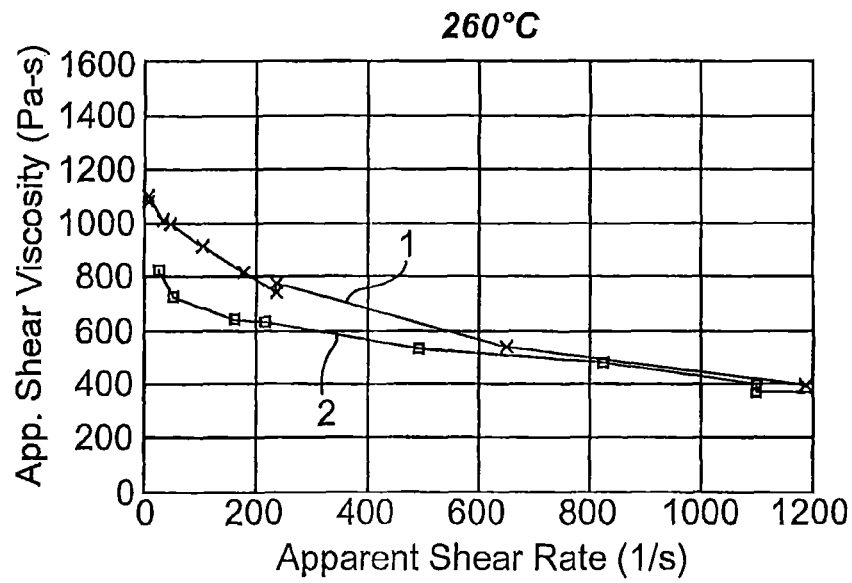
FIG. 3 is a graph of apparent shear viscosity vs. apparent shear rate at 260° C. for two conventional thermoplastic polymers, as employed in Comparative Example 2.

Samples of KOSA 1101E CPET (the 0.8 dl/g IV polyester used in Example 1) and EASTAR™ 6763 glycol-modified PET ("PETG", a 0.78 dl/g IV copolyester from Eastman Chemical Co.), were dried to a moisture value of about 50 ppm by Karl-Fischer analysis and tested for melt viscosity at 260° C. The results are set out in FIG. 3, which shows viscosity versus shear curves for KOSA 1101E CPET (curve 1) and for EASTAR™ 6763 PETG (curve 2). Based on the melt viscosity measurements, one might assume that layers of either material, or layers containing a blend of both materials, would exhibit sufficiently similar melt viscosity at a given temperature and shear rate so that they could be coextruded. The formulations shown below in Table 3 were prepared to test this assumption.

TABLE 3

| Layer | Formulation |
|---|---|
| Top | 75% KOSA 1101E CPET + 25% EASTAR 6763 PETG |
| Middle | 100% KOSA 1101E CPET |
| Bottom | 25% KOSA 1101E CPET + 75% EASTAR 6763 PETG |

Figure 4:
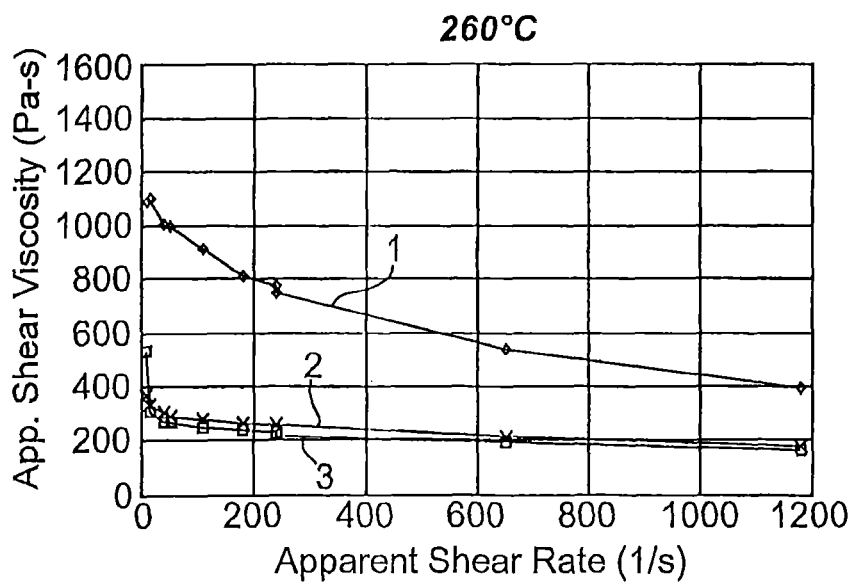
FIG. 4 is a graph of apparent shear viscosity vs. apparent shear rate at 260° C. for two pre-compounded blends of the thermoplastic polymers shown in FIG. 3.

The top and bottom layer formulations were pre-compounded by feeding pellets of the dried KOSA 1101E CPET and EASTAR 6763 PETG polymers to a commercial 75 mm twin screw extruder at a temperature of 265-280° C. The resulting extruded polymer blends were formed into pellets, allowed to crystallize, dried to a moisture value less than 50 ppm (by Karl-Fischer analysis) and tested for melt viscosity at 260° C. The results are set out in FIG. 4, which shows viscosity versus shear curves for the 100% KOSA 1101E CPET middle layer (curve 1), for the 75% KOSA 1101E CPET+25% EASTAR 6763 PETG top layer (curve 2), and for the 25% KOSA 1101E CPET+75% EASTAR 6763 PETG bottom layer (curve 3). The data shows that a very substantial reduction in the top and bottom layer melt viscosities occurred during the pre-compounding process and that the melt viscosity of the pre-compounded top and bottom layers would be well below that of the KOSA 1101E CPET middle layer. It would be difficult to carry out successful coextrusion of these three layers without encountering film forming deficiencies.

Example 2

Three Layer Coextrusion System with Solid State Polymerized Middle Layer

Figure 5:
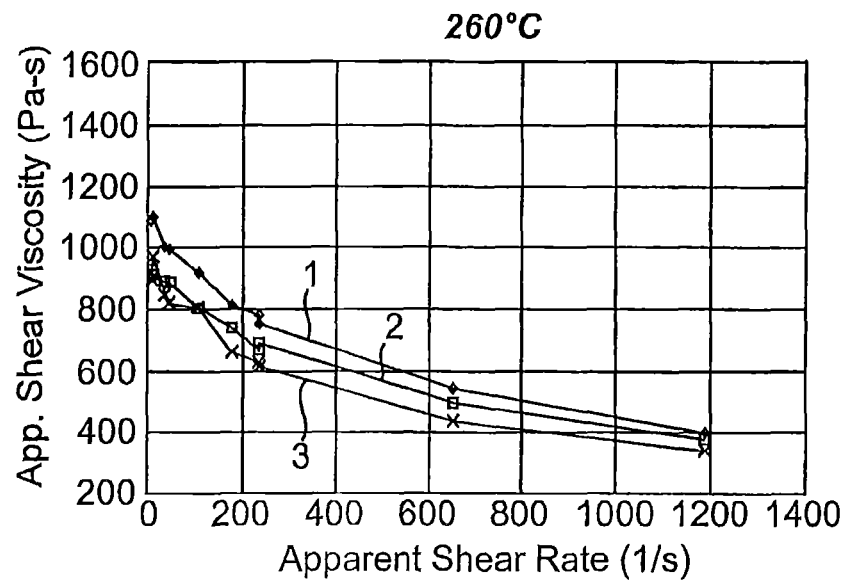
FIG. 5 is a graph of apparent shear viscosity vs. apparent shear rate at 260° C. for the blends shown in FIG. 4 and for one of the polymers in the blends after the blends have been solid state polymerized, as employed in Example 2.

Using the method of Example 1, the Comparative Example 2 pelletized pre-compounded blends were subjected to solid state polymerization for 12 hours at 200° C. under a vacuum of about 760 mm Hg. The resulting solid state polymerized polymer alloys were tested for melt viscosity at 260° C. The results are set out in FIG. 5, which shows viscosity versus shear curves for the 100% KOSA 1101E CPET middle layer (curve 1), for the solid state polymerized 75% KOSA 1101E CPET+25% EASTAR 6763 PETG top layer (curve 3), and for the solid state polymerized 25% KOSA 1101E CPET+75% EASTAR 6763 PETG bottom layer (curve 2). The data shows that the melt viscosities of the solid state polymerized top and bottom layer blends closely match the melt viscosity of the KOSA 1101E CPET middle layer, and that simultaneous coextrusion of all three layers together should be successful. A sample of the film should be bondable to a steel substrate by heating the steel to about 50-300° C. and then pressing the film against the heated substrate.

Comparison Example 3

Pigmented Film

Figure 6:
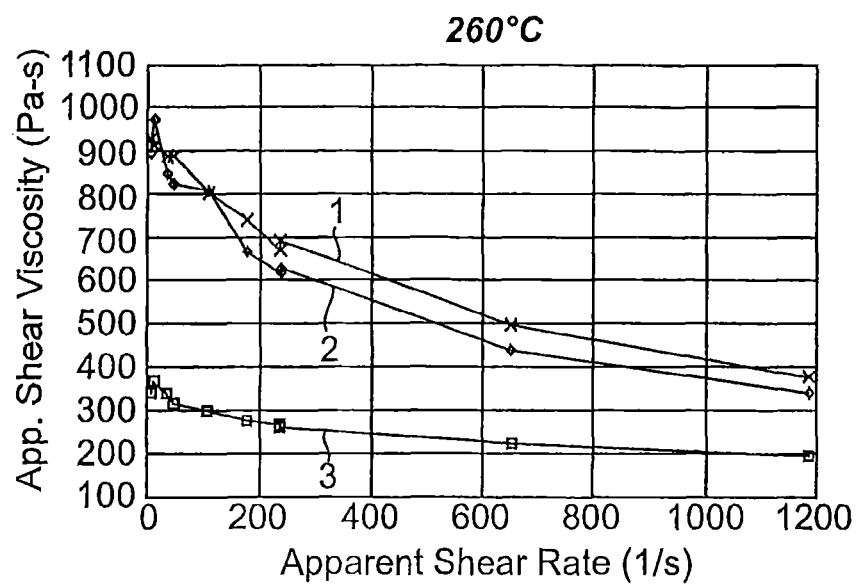
FIG. 6 is a graph of apparent shear viscosity vs. apparent shear rate at 260° C. for a filled thermoplastic polymer and for two solid state polymerized thermoplastic polymer blends, as employed in Comparative Example 3.

Using an extruder, 40 wt. % TiONA™ 188 Titanium Dioxide (from Millennium Chemicals) was pre-compounded into 60 wt. % KOSA 1101E CPET to provide a white version of the middle layer employed in Example 2. The pre-compounding step caused a substantial decrease in melt viscosity for the resulting filled polymer blend. The filled polymer blend was formed into pellets, allowed to crystallize, dried to a moisture value less than 50 ppm (by Karl-Fischer analysis) and tested for melt viscosity at 260° C. The results are set out in FIG. 6, which shows viscosity versus shear curves for the 60% KOSA 1101E CPET+40 titanium dioxide middle layer (curve 3), for the 75% KOSA 1101E CPET+25% EASTAR 6763 PETG top layer (curve 1), and for the 25% KOSA 1101E CPET+75% EASTAR 6763 PETG bottom layer (curve 2). The data shows that a very substantial reduction in the middle layer melt viscosity occurred during the pre-compounding process and that the melt viscosity of the pre-compounded top and bottom layers would be well above that of the filled KOSA 1101E CPET middle layer. It would be difficult to carry out successful coextrusion of these three layers without encountering film forming deficiencies.

Example 3

Figure 7:
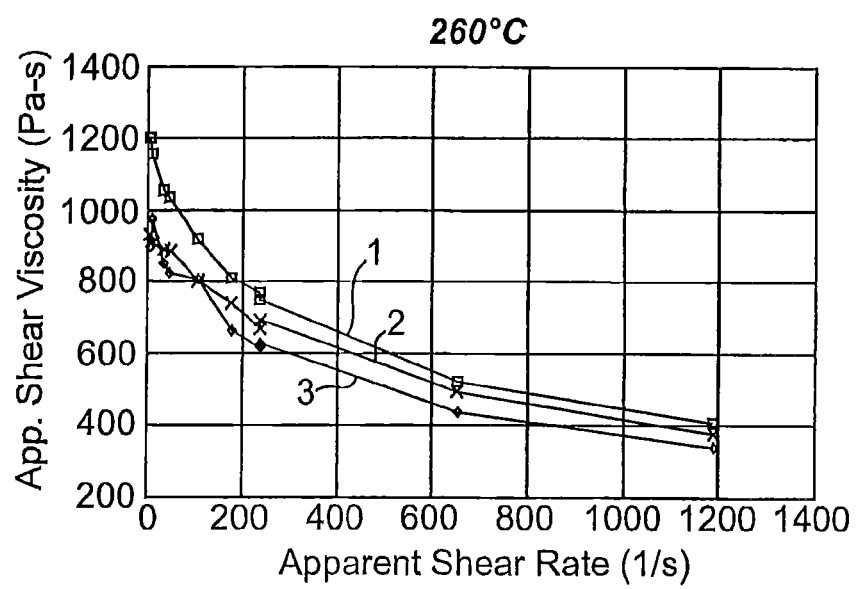
FIG. 7 is a graph of apparent shear viscosity vs. apparent shear rate at 260° C. for the thermoplastic materials shown in FIG. 6 after the filled thermoplastic polymer has been solid state polymerized.

Three Layer Coextrusion System with Solid State Polymerized Pigmented Middle Layer Using the method of Example 1, the Comparative Example 3 pelletized pre-compounded middle layer composition was subjected to solid state polymerization for 16 hours at 190° C. under a vacuum of about 760 mm Hg. The resulting solid state polymerized filled polymer blend was tested for melt viscosity at 260° C. The results are set out in FIG. 7, which shows viscosity versus shear curves for the solid state polymerized 60% KOSA 1101E CPET+40% titanium dioxide middle layer (curve 1), for the solid state polymerized 75% KOSA 1101E CPET+25% EASTAR 6763 PETG top layer (curve 3), and for the solid state polymerized 25% KOSA 1101E CPET+75% EASTAR 6763 PETG bottom layer (curve 2). The data shows that the melt viscosities of the solid state polymerized top and bottom layer blends closely match the melt viscosity of the pigmented middle layer, and that simultaneous coextrusion of all three layers together should be successful.

Various modifications and alterations of this invention will be apparent to those skilled in the art without departing from this invention. It should therefor be understood that this invention is not limited to the illustrative embodiments set forth above.

I claim:

1. A multilayer film comprising:
a first polymeric layer defining a first melt viscosity; and
a second polymeric layer, wherein the second polymeric layer is directly adjacent to and coextruded with the first polymeric layer to form a freestanding self-supporting film,
wherein the first and second polymeric layers are different, and
wherein the second polymeric layer comprises a modified polymer alloy to provide the second polymeric layer with a second melt viscosity within about ±15% of the first melt viscosity of the first polymeric layer at an extrusion temperature selected within a temperature range of about 200-300° C. and a shear rate selected within a shear rate range of about 50-500 l/s,
wherein the modified polymer alloy comprises a thermoplastic polymer and at least one dissimilar polymer, wherein at least the thermoplastic polymer is advanceable by solid state polymerization and comprises one or more:
condensation polymers selected from polyesters, copolyesters, polyamides, polycarbonates, and combinations thereof;
addition polymers selected from polylactones, polymethyl methacrylate (PMMA), styrene/maleic anhydride (SMA), polyurethanes, and combinations thereof; or
an advanceable polymer selected from polyoxymethylene (POM), polyketones, thermoplastic fluoropolymers, polyphenylene oxide (PPO), imide polymers, sulfone polymer's polyaminoacids, polydimethylsiloxanes, and combinations thereof, and
wherein the thermoplastic polymer has been blended with the dissimilar polymer, and the blend has been solid state polymerized to have a melt viscosity greater than that of the blend before solid state polymerization.

2. The multilayer film according to claim 1 wherein the thermoplastic polymer comprises a condensation polymer.

3. The multilayer film according to claim 1 wherein the thermoplastic polymer comprises an alkyd polyester or an alkyd copolyester.

4. The multilayer film according to claim 1 wherein the thermoplastic polymer comprises a polyester.

5. The multilayer film according to claim 1 wherein the thermoplastic polymer comprises a polyester and the dissimilar polymer comprises a copolyester.

6. The multilayer film according to claim 1 wherein all layers of the multilayer film have a melt viscosity within about ±15% of the modified polymer alloy melt viscosity at an extrusion temperature selected within a temperature range of about 200-300° C. and a shear rate selected within a shear rate range of about 50-500 l/s.

7. The multilayer film according to claim 1 wherein all layers of the multilayer film have a melt viscosity within about ±10% of the modified polymer alloy melt viscosity at an extrusion temperature selected within a temperature range of about 200-300° C. and a shear rate selected within a shear rate range of about 50-500 l/s.

8. The multilayer film according to claim 1 wherein all layers of the multilayer film have a melt viscosity within about ±5% of the modified polymer alloy melt viscosity at an extrusion temperature selected within a temperature range of about 200-300° C. and a shear rate selected within a shear rate range of about 50-500 l/s.

9. The multilayer film according to claim 1 wherein the thermoplastic polymer comprises a polyester homopolymer.

10. The multilayer film according to claim 1 wherein the thermoplastic polymer comprises polyethylene terephthalate.

11. The multilayer film according to claim 1 wherein the dissimilar polymer comprises a condensation polymer.

12. The multilayer film according to claim 1 wherein the thermoplastic polymer and dissimilar polymer both comprise condensation polymers.

13. The multilayer film according to claim 1 wherein the dissimilar polymer is advanceable by solid state polymerization.

14. The multilayer film according to claim 1 wherein the dissimilar polymer is not advanceable by solid state polymerization.

15. The multilayer film according to claim 1 wherein the dissimilar polymer has a Tg that on an absolute scale differs from that of the thermoplastic polymer by ±5% or more.

16. The multilayer film according to claim 1 wherein the first polymeric layer contains polyethylene terephthalate, the second polymeric layer contains polyethylene terephthalate and a copolyester, and
wherein the multilayer film further comprises a third polymeric layer containing polyethylene terephthalate and a copolyester and directly adjacent to and coextruded with the first polymeric layer, the third polymeric layer having a third melt viscosity within about ±15% of the first melt viscosity of the first polymeric layer at an extrusion temperature selected within a temperature range of about 200-300° C. and a shear rate selected within a shear rate range of about 50-500 l/s.

17. The multilayer film according to claim 1 wherein the modified polymer alloy contains rearranged blocks or segments of the thermoplastic polymer and dissimilar polymer.

18. The multilayer film according to claim 1 wherein the film contains recycled polyethylene terephthalate.

19. The multilayer film according to claim 1 wherein the film contains virgin and recycled polyethylene terephthalates.

20. The multilayer film according to claim 1 wherein the modified polymer alloy contains a blend of from about 99 to about 1 weight percent of the thermoplastic polymer and from about 1 to about 99 weight percent of the at least one dissimilar polymer.

21. The multilayer film according to claim 1 wherein the modified polymer alloy contains a blend of from about 95 to about 5 weight percent of the thermoplastic polymer and from about 5 to about 95 weight percent of the at least one dissimilar polymer.

22. The multilayer film according to claim 1 wherein the modified polymer alloy contains a blend of from about 90 to about 10 weight percent of the thermoplastic polymer and from about 10 to about 90 weight percent of the at least one dissimilar polymer.

23. A process for forming a multilayer film comprising:
a) providing a first thermoplastic polymer used to form a first polymeric layer defining a first melt viscosity at a chosen extrusion temperature selected within a temperature range of about 200-300° C. and a chosen shear rate selected within a shear rate range of about 50-500 l/s;
b) providing a second thermoplastic polymer advanceable by solid state polymerization and comprising:
condensation polymers selected from polyesters, copolyesters, polyamides, polycarbonates, and combinations thereof;
addition polymers selected from polylactones, polymethyl methacrylate (PMMA), styrene/maleic anhydride (SMA), polyurethanes, and combinations thereof; or
an advanceable polymer selected from polyoxymethylene (POM), polyketones, thermoplastic fluoropolymers, polyphenylene oxide (PPO), imide polymers, sulfone polymer's polyaminoacids, polydimethylsiloxanes, and combinations thereof;
c) blending the second thermoplastic polymer with at least one dissimilar polymer;
d) solid state polymerizing the blended second thermoplastic polymer and at least one dissimilar polymer to form a modified polymer alloy having a second melt viscosity greater than that of the blend before solid state polymerization and within about ±15% of the first melt viscosity at the chosen extrusion temperature and chosen shear rate;
e) coextruding a layer of the modified polymer alloy and a layer of the first thermoplastic polymer directly adjacent to one another to form the first polymeric layer having the first melt viscosity and a second polymeric layer having the second melt viscosity; and
f) cooling the coextruded layers to form a freestanding, self-supporting multilayer film.

* * * * *